(12) United States Patent
Jones

(10) Patent No.: US 7,077,443 B1
(45) Date of Patent: Jul. 18, 2006

(54) SANITARY PICK-UP DEVICE

(76) Inventor: Galen Jones, 6729 Crooked Stick Dr., Fort Worth, TX (US) 76132-4527

( * ) Notice: Subject to any disclaimer, the term of this patent is extended or adjusted under 35 U.S.C. 154(b) by 138 days.

(21) Appl. No.: 10/640,541

(22) Filed: Aug. 13, 2003

Related U.S. Application Data

(60) Provisional application No. 60/404,474, filed on Aug. 20, 2002.

(51) Int. Cl.
*A01K 29/00* (2006.01)
*E01H 1/12* (2006.01)

(52) U.S. Cl. ........................ 294/1.4; 294/104

(58) Field of Classification Search ................. 294/1.1, 294/1.3–1.5, 19.1, 55, 50.9, 104; 15/257.1, 15/257.6
See application file for complete search history.

(56) References Cited

U.S. PATENT DOCUMENTS

| | | | | |
|---|---|---|---|---|
| 3,659,891 A | * | 5/1972 | Pettenon et al. | ............. 294/1.4 |
| 4,225,174 A | * | 9/1980 | Hennessy et al. | ............. 294/1.4 |
| 4,819,977 A | * | 4/1989 | Cooper | ........................ 294/1.4 |
| 5,503,442 A | * | 4/1996 | Lee | ............................. 294/1.4 |
| 5,669,645 A | * | 9/1997 | Chuang | ........................ 294/1.3 |
| 6,068,311 A | * | 5/2000 | Jones | ........................ 294/1.4 |
| 6,076,717 A | * | 6/2000 | Edwards et al. | ................ 225/6 |

FOREIGN PATENT DOCUMENTS

FR  2 683 139  * 5/1993

* cited by examiner

*Primary Examiner*—Dean J. Kramer
(74) *Attorney, Agent, or Firm*—Colin P. Abrahams

(57) ABSTRACT

The pick-up device provides an elongated hollow cylindrical body including a handle at one end and a bail arrangement at the other end. The handle includes a trigger mechanism extending through the hollow body and terminating in a crank coupling the pair of bails in the bail assembly, so that one bail is fixed and the other bail is movable with respect to the fixed bail. The body includes a roller upon which a supply of litter bags is placed, and the body includes an elongated slot with finger openings so that a single bag from the supply can be withdrawn from the roll, separated from the roll, and installed on the pair of bails in the bail arrangement. A cable is employed for releasably actuating the bail and mechanism is provided for rotatably mounting the handle and trigger mechanism onto one end of the body so that the handle can be rotated as to expose the aft end of the body permitting a new roll of bags to be installed. Alternately, a bag supply cartridge may be installed through the side of the body.

3 Claims, 4 Drawing Sheets

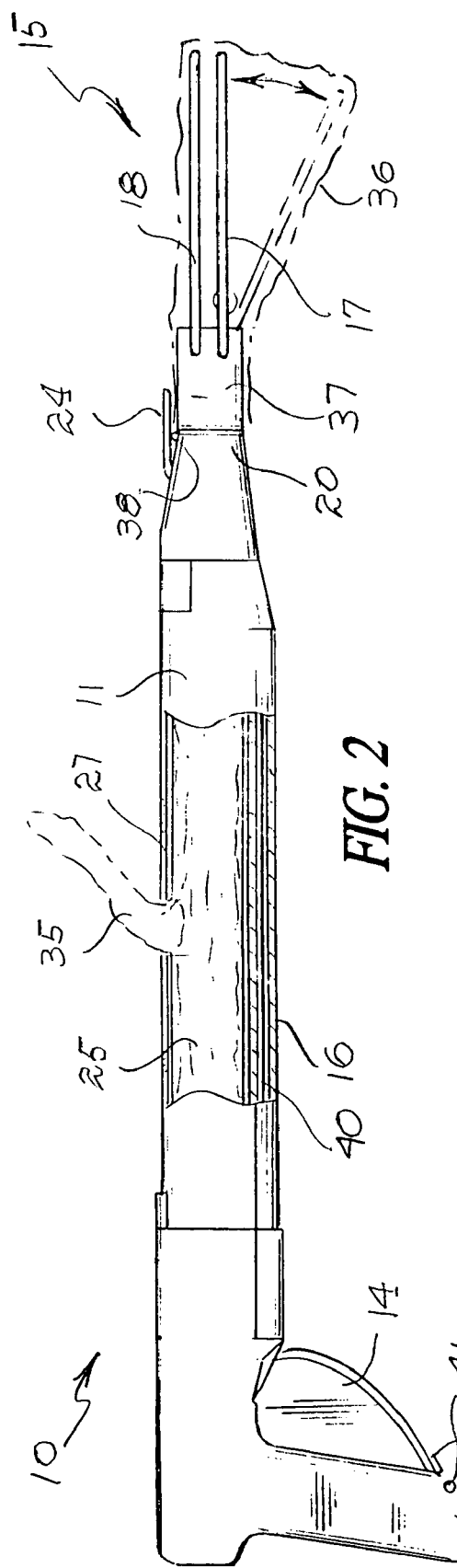
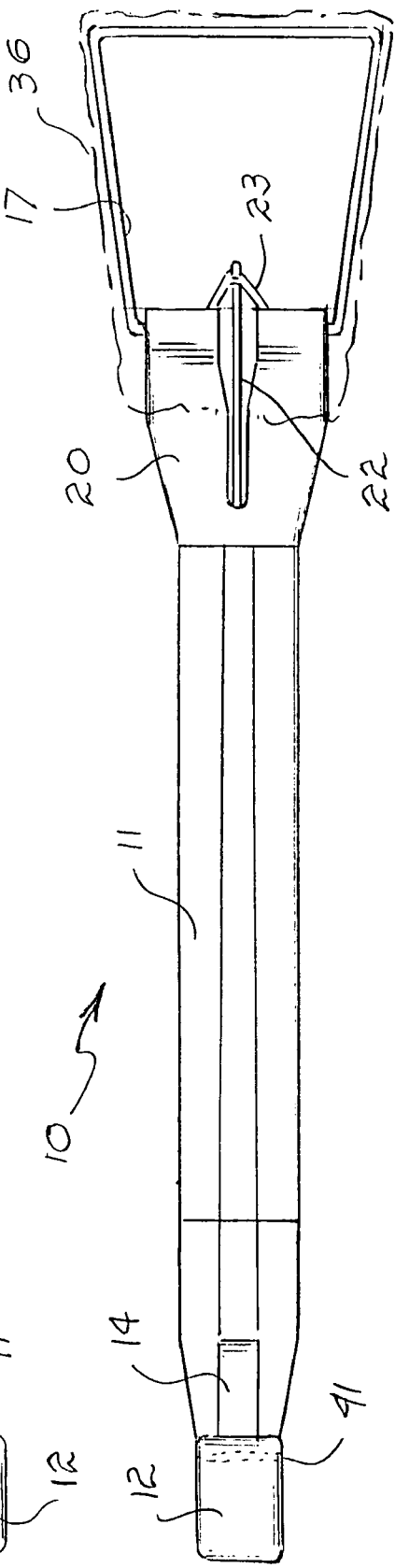
FIG. 2
FIG. 3

SANITARY PICK-UP DEVICE

Priority claimed on Ser. No. 60/404,474 filed Aug. 20, 2002.

BACKGROUND OF THE INVENTION

1. Field of the Invention

The present invention relates to the field of pick-up devices for animal litter, trash or the like, and more particularly to a pick-up device having foldable or rotatable portions enabling the device to be arranged in a compact manner for commercial displays, and which further includes a trigger mechanism having a bail lock, and a storage compartment for holding a quantity of bags used in the procedure of animal litter or trash pick-up.

2. Brief Description of the Prior Art

In the past, it has been a conventional practice to provide pick-up devices for automatically grabbing and holding animal litter, trash or the like. Problems and difficulties have been encountered with such conventional devices because components of the device extend outwardly from the main body of the device so that it is difficult to arrange the device for commercial display in the marketplace or to be forwarded through a mail service. Conventional pick-up devices are not compact and are generally not suitable for commercial display. Furthermore, most prior pick-up devices do not have a bail locking means for preventing premature release of a loaded collection bag which is generally carried on the device. Also, it is difficult for the user to release the bag for ultimate disposal in a refuse container or the like. Still a further problem when employing conventional trash or animal litter pick-up devices resides in providing a supply of bags, such as a roll of bags, in the body of the device itself so that the bags and the device provide a unitary construction and the bags are available for use without the user having to store the bags in a remote location. The bags should be stored on a roll and means should be provided for permitting the bags to be pulled from storage and separated on an individual basis for usage.

Therefore, a long-standing need has existed to provide a novel animal litter or trash pick-up device, which includes a storage arrangement for a multiple bag supply and which will permit removal of an individual bag from the supply for assembly onto spreadable bails carried on the device. Also, a releasable locking mechanism should be included for controlling the bail separation mechanism.

SUMMARY OF THE INVENTION

Accordingly, the above problems and difficulties are avoided by the present invention which provides an elongated hollow cylindrical body which includes a handle at one end and a bail arrangement at the other end. The handle includes a trigger mechanism having means extending through the hollow body and terminating in a crank means coupling the pair of bails in the bail assembly, so that one is fixed and the other is movable with respect to the fixed bail. The body further includes means for releasably storing a roller upon which the supply of litter bags are placed, and the body includes an elongated slot with finger openings so that a single bag from the supply can be withdrawn from the roll, separated from the roll, and installed on the pair of bails in the bail arrangement. A cable means is employed for releasably actuating the bail and means are provided for rotatably mounting the handle and trigger mechanism onto one end of the body so that the handle can be rotated as to expose the aft end of the body so a new roll of bags can be inserted. Therefore, no component of the device is awkwardly extending from the device when the device is in a compact, storage or display position.

Therefore, it is among the primary objects of the present invention to provide a novel animal litter or trash pick-up device, which includes a supply of litter bags carried on a roll within the body of the device, and wherein separate bags of the plurality may be withdrawn at the selection of the user.

Another object of the present invention is to provide a novel animal litter or trash pick-up device having a suitable locking mechanism for controlling the deployment of a bail arrangement, having a bag installed thereon to prevent premature release of a loaded or filled bag, whereby there is no spillage of litter or trash and whereby the entire bag containing litter or trash can readily be disposed into a disposal trash container.

Yet another object of the present invention is to provide a novel mechanism for permitting 90° rotation of the bail mount assembly mechanism with respect to the supporting body so that the pick-up device can be shipped or displayed in a compact arrangement.

A further object of the invention resides in providing not only a rotational lock for the bail mount assembly and a bail lock but a bag lock to prevent the bag from falling off the bails before expanding the bail arrangement.

A further object resides in providing a body lock for the pick-up device, having a stop and slot arrangement, wherein the body and handle are joined and held in a locked position by a longitudinal extension of the body assembly which fits into the handle assembly and is held in position by cable tension.

Still a further object of the present invention resides in providing a storage compartment in the body of a animal litter or trash pick-up device, which will hold a quantity of bags which are specifically designed for various sizes of trash or animal waste pick-up and wherein the bag size is selected to fit over the respective open bail envelope of the bail arrangement.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 2 is a side elevational view of the animal litter and trash pick-up device shown in FIG. 1, having a portion broken away to illustrate the internal bag storage compartment and assembly of a selected bag over the bail arrangement;

FIG. 3 is a bottom plan view of the animal litter and trash pick-up device shown in FIG. 2;

DESCRIPTION OF PREFERRED EMBODIMENT

Figure 1:
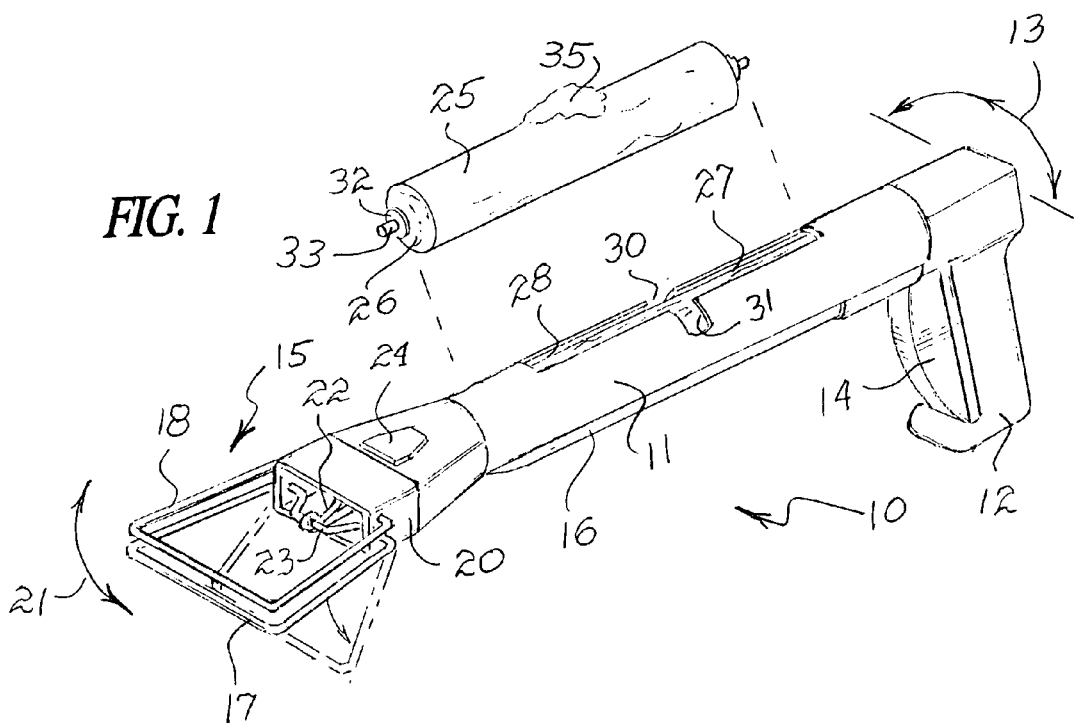
FIG. 1 is a front perspective view of the novel animal litter, waste or trash pick-up device illustrating the bail arrangement closed and illustrating a rolled supply of bags in a position preparatory for assembly with the body of the device in accordance with the present invention.

Referring to FIG. 1, the novel animal litter and trash pick-up device is indicated in the general direction of arrow 10 which includes an elongated body 11 having a handle 12 rotatably carried on one end of the body so as to be adapted for rotation to the right or the left, as indicated by numeral 13. The handle 12 includes a trigger 14 for operating a bail assembly illustrated in the direction of arrow 15. A conduit 16 carries a movable cable (not shown) which interconnects the trigger 14 with a movable bail 17 in the bail assembly 15. A fixed bail 18 is carried on a bail head 20 which is rotatable in either direction as indicated by numeral 21. The fixture 20 is rotatably carried on the end of the body 11, opposite from the end carrying handle 12. Therefore, it can be seen that the bail assembly 15 can be rotated so as to be in parallel relationship with the handle, constituting a display or storage or transportation position, and when rotated as illustrated in solid lines in FIG. 1, the device is in its operative position for usage.

When operated, the trigger 14 is pulled into the handle 12 by the user's hand and via the cable in conduit 16, the movable bail is positioned to the position shown in broken lines. The cable is connected to one end of a lever 22 which has its opposite end connected to a crank 23 serving as a cross-member between the end of the bail 17. Although not shown in FIG. 1, a pick-up bag is placed over the bail assembly 15 prior to operation of the movable bail which, when operated, would expand the bag for engagement with animal droppings or trash, followed by closing of the bail assembly to capture such litter or trash within the bag and whereby with removal of the bag from the bail assembly in a loaded condition, it can then be discarded into a trash container. Such a pick-up procedure is described in prior art patents issued to the present applicant, and a description as disclosed therein is incorporated into the present disclosure. A releasable lock for holding the bag onto the bail assembly is indicated by numeral 24.

Referring further to FIG. 1, a major feature of the invention resides in installing a plurality of pick-up bags 25 carried on a roller 26 designed specifically to fit into a storage compartment 27 in the body 11. The body includes an elongated slot 28 and a pair of cut-outs 30 and 31, whereby the user can place his fingers therein for grasping a portion of the exposed bag and manually pulling the bag through the slot 28. Once the bag has been exposed from the body 11, the bag can be separated from the supply and installed on the bail assembly or arrangement 15. The roller 26 includes a disk, such as disk 32, carried on a spindle 33, carried on opposite ends of the roller 26. The roller and supply of bags thereon can be introduced through the end of the body 11 by rotating the handle 12 so as to open the end of the body, the entrance to the storage compartment or cavity is available for insertably receiving the roller and bags. Numeral 35 shows a tuft or collection of the outermost bag in the supply caused by gathering of the material when the user's fingers are inserted through the cutouts 30 and 31 and portion 35 is grasped and gathered by the user preparatory for pulling the uppermost bag from the roll. The roller 26 will rotate on the spindle 33 within the housing 11.

Referring now in detail to FIG. 2, it can be seen that the roll of bags 25 is placed within the storage compartment 27 in the body 11 and that a portion of a bag is pulled outwardly toward the slot 28 by the user. Once the bag has been extracted and separated from the bulk supply on the roller, the selected and separated bag can then be placed over the bails 17 and 18, as shown in broken lines, and represented by numeral 36. The open end of the bag is introduced to the extreme terminating ends of the bails and the bails are inserted into the interior of the bag with the mouth of the bag terminating about portion 37 of the fixture 20. An edge marginal region of the mouth of the bag is placed under the clamp 24 serving as a lock for releasably holding the bag in position on the bail arrangement. The lock 24 is slightly raised for insertion of the edge marginal region of the mouth of the bag to be inserted over a nub 38 followed by release of the lock which clamps the bag to the fixture 20.

It can also be seen that the conduit or channel 16 encloses a cable 40 which extends from the trigger mechanism 14 to the crank 23 of the bail 17 via the lever 22.

FIG. 3 illustrates the crank 23 of bail 17 connected to one end of the lever 22 with the opposite end of the lever connected to the end of cable 40. The opposite end of the cable 40 terminates with the trigger 14 of the trigger mechanism whereby the trigger 14 pivots about a pivot connected with the handle 12, as represented by numeral 41 in FIG. 2.

Figure 4:
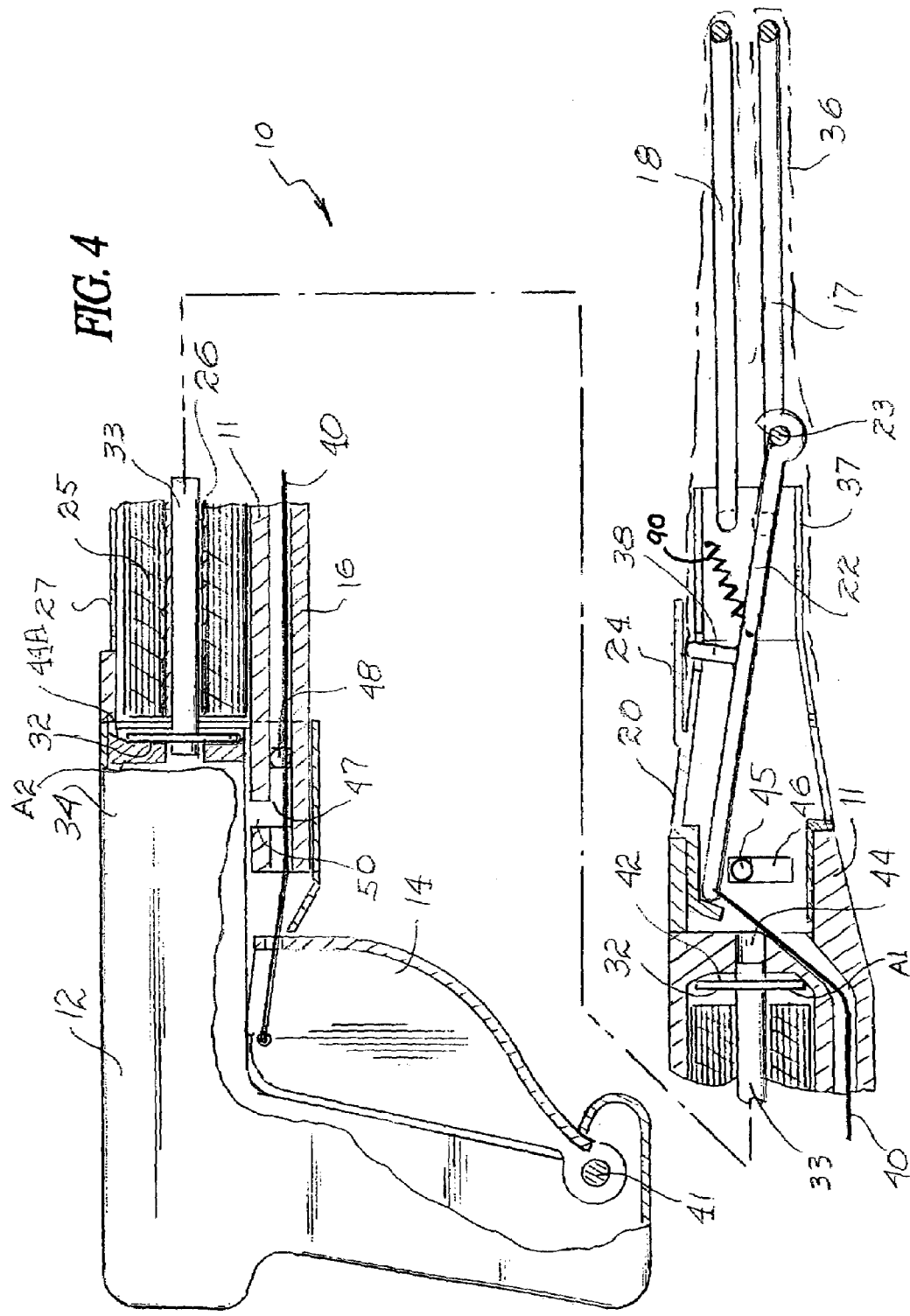
FIG. 4 is an enlarged sectional view of the trigger mechanism and the bail assembly employed in the present invention.

Referring now in detail to FIG. 4, it can be seen that the spindle 33 of the roller 26 is captured at each end by a disk 32. The disks 32 adjacent to the fixtures A1, A2 is recessed in a tapered compartment 42. The extreme ends of spindle 33 are inserted into bores 44 in the body 11, and 44A in the handle.

It can be seen that the fixture 20 can be rotated with respect to the end of body 11 by means of a pin 45 traveling within a slot 46 in the fixture 20. The pin 45 is attached to the body while the slot is in the fixture and the fixture can rotate either right or left, as indicated by numeral 21 in FIG. 1.

With respect to rotation of the handle 12 in the direction of arrow 13 in FIG. 1, it is noted that the body includes a slot 47 for receiving a pin 48 which is carried on the handle 12. It can also be seen that the body and handle can be easily extended in opposite directions and by rotating the handle so that the pin 48 rides in an opening 50. Therefore, the handle can be rotated 90° so that a replacement roll of bags 25 can be inserted.

Figure 5:
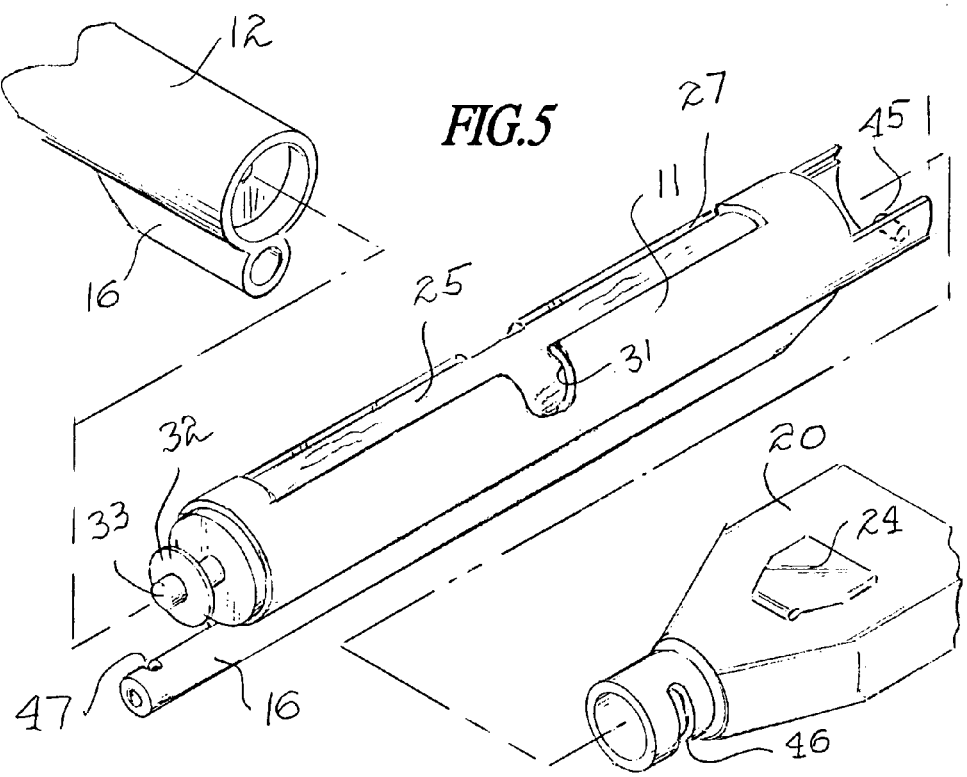
FIG. 5 is an exploded perspective view illustrating the assembly of various components comprising the animal litter and waste pick-up device incorporating the present invention.

Referring now in detail to FIG. 5, it can be seen that the pin 45 can be rotated within the slot 46 while the pin 48, shown in FIG. 4, is within the slot 47. The end disks 32 on the spindle 33 serves to provide stops for mounting the spindle in the end of handle 12 and the end of fixture 20 or the end of body 11 respectively.

Therefore, in view of the foregoing, it can be seen that the animal litter or waste pick-up device of the present invention provides a means for storing a plurality of bags that can be selectively removed from the body of the device at the selection of the user. Once the bag has been separated from the bulk material on the spindle, the separated bag can be opened and can insertably receive the bails 17 and 18 while the bails are in a closed position. Upon securement of the edge marginal region of the bag with the lock or clamp 24, the device is now ready for use. Upon squeezing of handle 12 to pivot trigger 14, the movable bail 17 will outwardly deploy while inside the bag to stretch the bottom of the bag between the ends of the bails 17 and 18. The deployment of the bail 17 is achieved by means of the cable 40 which operates the lever 22 and works the crank 23. A spring 90, as shown in FIG. 4, places a bias on the lever 22 urging the nub 38 into a clamping position with the lock 24 to retain the bag in position. Trash or litter may now be picked up by the bails by placing the bottom of the bag as stretched outwardly by deployment of the bails and placing this portion of the bag over the litter or waste. Upon release of the trigger, the spring-biased bail 17 will close over the litter and waste that has been captured by the bag, folding the bag back over upon itself to completely capture the waste or litter within the bag so that the bag may now be destroyed or disposed in a trash container or the like. For storage or shipment or even display of the device, the bail mount assembly may be rotated so that it is in a parallel relationship with the handle, and therefore provides an elongated, relatively flat and unencumbered configuration.

Figure 6:
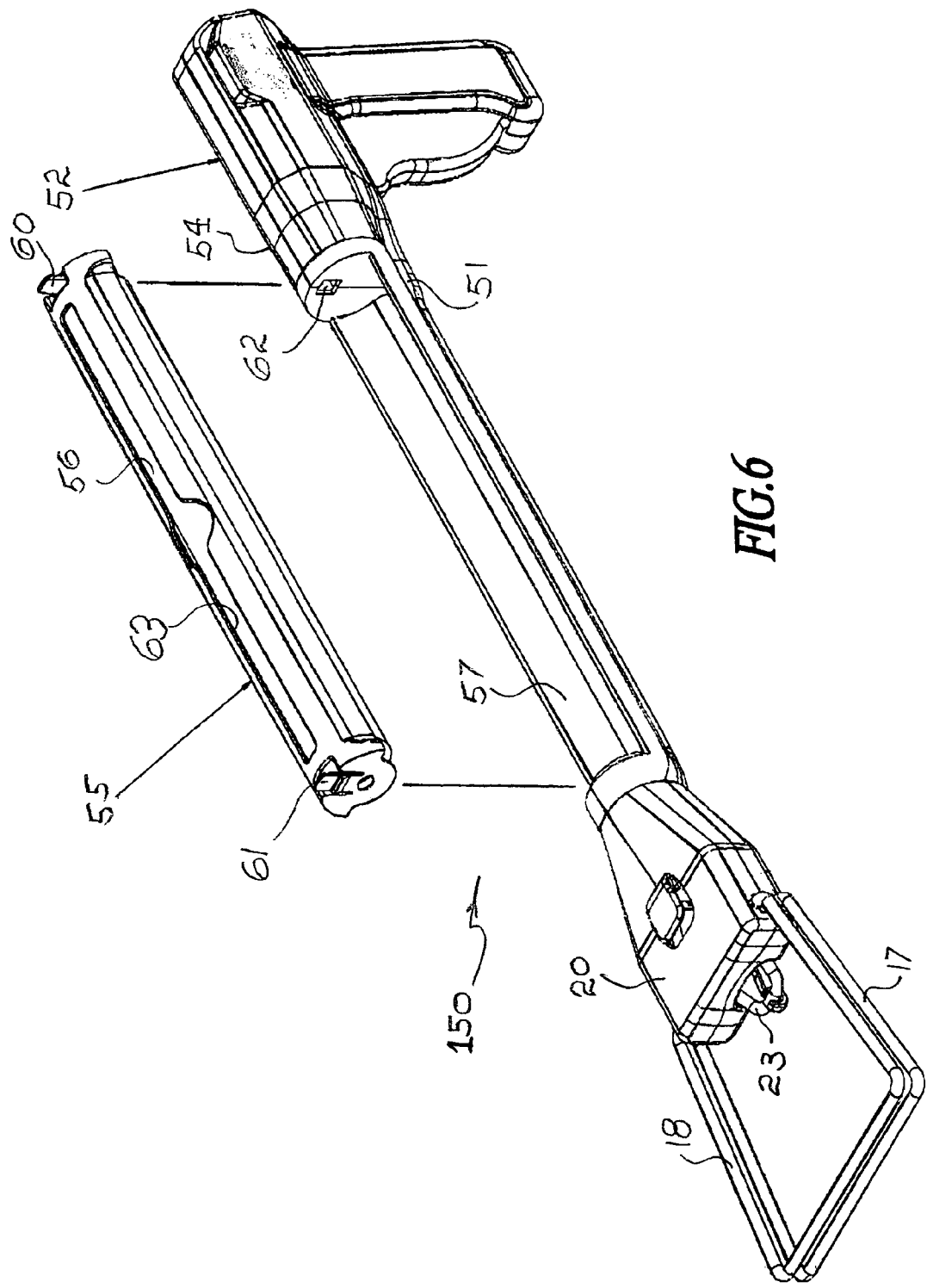
FIG. 6 is an exploded perspective view of another version of the device showing a side loading arrangement for installing or removing a cartridge containing a supply of bags.

Another version of the inventive device is shown in FIG. 6 in the direction of arrow 150 and is similar in construction to the previously described device 10 with the following three exceptions. The body 51 and handle 52 are molded together and split into two pieces for ease of production. The device 150 is constructed of a two-piece handle 52 and a one-piece body 51 internally joined at a junction 54 that can be extended and rotated.

Another exception is that the main feature of the device 50 which is distinguishable from the previously described device 10 is the use of a disposal cartridge 55 containing a supply of bags 56. Each independent cartridge is constructed of a light-weight material that includes an elongated slot and contains a roll of disposable bags. These cartridges are designed to "snap" into the top portion of the body 50 via an elongated channel 57. When installed, each cartridge is flush with the exterior surface of the body so that the lines of the installed cartridge will match with the lines of the body 50. The bags are rolled on a core, inserted and locked into the open bottom of each cartridge during a manufacturing procedure. These cartridges are to be made available to the user as an economical disposable unit. The bags are constructed of plastic, paper or other suitable material. The overall length of the device 50 shown in FIG. 6 is shorter than the previously described device 10, which is made possible by the use of the disposal bag cartridges.

The operation of the device 50 shown in FIG. 6 is nearly the same as the previously described version. The bail mount housing rotates 90° along a longitudinal axis, parallel to the handle for packaging and storage and perpendicular for operation as described with respect to the earlier version. The disposable cartridge 55 is inserted and "snapped" into the open top portion or channel of the body by the user. The snap relationship is made possible by means of resilient lock tabs 60 and 61, carried on the opposite ends of the cartridge, which when the cartridge is pressed into the channel 57, snaps into respective holes in the body, such as hole 62 with respect to tab 60. Each end of the cartridge has identical lock tabs, allowing quick locking and releasing. A bag is then pulled through the opening slot 63 in the top of the cartridge by use of the user's thumb and index finger, and the selected bag is then inserted on the closed bails, as previously described with respect to device 10.

When the bags are depleted, the user simply uses a finger or thumb to unlock the cartridge tabs which is then released and discarded into a refuge bin. To replace the cartridge, the user simply acquires a new cartridge and inserts the cartridge into the open area of the body. The cartridge is then "snapped" into place by the lock tabs on each end which firmly holds the new cartridge in position for immediate use.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A sanitary pick-up device comprising:
an elongated body having a pair of opposite ends integrally joined by a midsection;
a fixed bail and a movable bail carried on a selected end of said body and a handgrip carried on a non-selected end of said body;
actuation means connected between said handgrip and said movable bail for moving said movable bail to and from said fixed bail;
a supply of bags;
a storage compartment in said body midsection for insertably receiving said supply of bags;
attachment means cooperatively carried on said supply of bags for releasably retaining said supply of bags on said body midsection within said storage compartment;
a cartridge having said supply of bags carried thereon providing a unitary article adapted to be inserted into said storage compartment, where said body midsection includes an elongated opening for insertably passing said cartridge with said supply of bags into said storage compartment;
said supply of bags are carried on a rotatable spindle within said cartridge;
said cartridge includes an elongated slot exposing said supply of bags; and
said cartridge has an exterior surface coextensive with an exterior surface of said body midsection.

2. The pick-up device defined in claim 1 wherein:
said attachment means includes a pair of resilient tabs separated by said cartridge and a pair of openings in said body midsection separated by said storage compartment and said tabs releasably connectable with said body midsection via said pair of openings.

3. The pick-up device defined in claim 2 wherein:
said tabs and said openings constitute a snap lock relationship for releasably retaining said cartridge on said body.

* * * * *